(12) United States Patent
Carlson et al.

(10) Patent No.: US 10,946,732 B2
(45) Date of Patent: Mar. 16, 2021

(54) TILT AND OUTER SLIDE SYSTEM FOR PANORAMIC SUNROOFS

(71) Applicant: AISIN TECHNICAL CENTER OF AMERICA, INC., Northville, MI (US)

(72) Inventors: Erik Carlson, Northville, MI (US); Shintaro Katsura, Northville, MI (US)

(73) Assignee: AISIN TECHNICAL CENTER OF AMERICA, INC., Northville, MI (US)

( * ) Notice: Subject to any disclaimer, the term of this patent is extended or adjusted under 35 U.S.C. 154(b) by 168 days.

(21) Appl. No.: 16/356,331

(22) Filed: Mar. 18, 2019

(65) Prior Publication Data

US 2020/0298685 A1 Sep. 24, 2020

(51) Int. Cl.
*B60J 7/043* (2006.01)
*B60J 7/057* (2006.01)

(52) U.S. Cl.
CPC ........... *B60J 7/0435* (2013.01); *B60J 7/0573* (2013.01); *E05Y 2900/542* (2013.01)

(58) Field of Classification Search
CPC ........... B60J 7/0435; B60J 7/022; B60J 7/024
USPC ...................................... 296/216.02–216.05
See application file for complete search history.

(56) References Cited

U.S. PATENT DOCUMENTS

| 5,259,662 | A | 11/1993 | Huyer |
| 7,125,070 | B2 | 10/2006 | Sawada et al. |
| 9,321,334 | B2 | 4/2016 | Katsura et al. |
| 2020/0298683 | A1* | 9/2020 | Carlson ................. B60J 7/0435 |
| 2020/0298684 | A1* | 9/2020 | Carlson .................... B60J 7/192 |
| 2020/0298685 | A1* | 9/2020 | Carlson ................. B60J 7/0573 |
| 2020/0298686 | A1* | 9/2020 | Carlson ................. B60J 7/0573 |

FOREIGN PATENT DOCUMENTS

| JP | 60-143119 A | 7/1985 |
| JP | 60-143123 A | 7/1985 |
| JP | 7-149152 A | 6/1995 |

* cited by examiner

*Primary Examiner* — Dennis H Pedder
(74) *Attorney, Agent, or Firm* — Oblon, McClelland, Maier & Neustadt, L.L.P.

(57) ABSTRACT

An tilt and slide apparatus and method for a sunroof of a vehicle, includes a movable panel, a rail provided at each edge portion in the opening, a receiver bracket affixed to the movable panel, a guide block having a first guide channel that extends along a length of the guide block and has an angled portion, a second guide channel positioned at an end of the guide block, an upper guide channel extending away from the second guide channel to an opposite end of the guide block and above the first guide channel, and a drive shoe that slides along the rail. A pivot link is configured to slide along the first guide channel to control tilting of the movable panel as the drive shoe slides in a forward direction. A lift guide facilitates sliding of the tilted movable panel along the upper guide channel in a rear direction.

17 Claims, 12 Drawing Sheets

TILT AND OUTER SLIDE SYSTEM FOR PANORAMIC SUNROOFS

BACKGROUND

Field of the Disclosure

The present disclosure is directed towards a tilt and outer slide apparatus for a vehicle sunroof.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Automotive vehicles may be provided with a sunroof in the roof of the passenger compartment. A sunroof assembly may include one or more glass panels in a window assembly. An opening mechanism may be included in which at least one of the glass panels is movable. The movable glass panel opens and closes a substantially rectangular opening defined by a periphery of a housing. The housing is mounted to an opening in the vehicle roof. A panoramic sunroof is a sunroof that is large enough to extend over front and rear passengers in a vehicle. Panoramic sunroofs are found in sedans and sport utility vehicles that have a long roofline that can accommodate the large sunroof. A panoramic sunroof may have one large glass panel or may have two separate glass panels, one glass panel for the front and one glass panel for the rear passengers. Some panoramic sunroofs having a separate front glass panel may slide the front glass panel back over the rear glass panel. Some panoramic sunroofs have a front glass panel that is able to tilt.

Some sunroof systems tilt a glass panel and then slide the tilted panel to open a vehicle sunroof. In order to tilt the glass panel, the sunroof system includes a tilt-up stroke that pushes functional components rearward. Such tilt and slide sunroof systems have tilt-up strokes that move at a relatively fast speed as it is generally considered necessary to quickly open the sunroof. However, such sunroof systems with relatively fast tilt-up strokes have had situations where the sunroof motor stalls during sunroof operation when a vehicle is traveling at high speeds, e.g., highway speeds. In other words, such sunroof systems push functional components in a rearward direction during the tilt-up stroke, which may adversely affect sunroof operation at the high speeds. In addition, such fast operating sunroof systems have been found to have a risk of pinching during various phases of operation.

SUMMARY

The present disclosure relates to a tilt and slide apparatus for a sunroof of a vehicle, including a movable panel configured to open and close an opening formed at a roof of the vehicle; a rail provided at each edge portion in the opening in a vehicle width direction and being extended in a front-rear direction of the vehicle; a receiver bracket affixed to the movable panel, the receiver bracket having a first pin at an end of the receiver bracket; a guide block having a first guide channel, a second guide channel and an upper guide channel, the first guide channel extends along a length of the guide block and has an angled portion, the second guide channel positioned at or near an end of the guide block and receives the first pin of the receiver bracket, the upper guide channel extending away from the second guide channel to an opposite end of the guide block and above the first guide channel; a movable drive shoe configured to slide along the rail and a pivot link pivotally coupled to the drive shoe, the pivot link configured to slide along the first guide channel of the guide block to control tilting of the movable panel as the drive shoe slides in a forward direction toward the front of the vehicle; a lift guide connected to an end of the movable panel for maintaining a position of the front of the receiver bracket and for facilitating sliding of the movable panel in a rear direction opposite the forward direction.

The present disclosure relates to a method for a tilt and slide apparatus for a sunroof of a vehicle, the sunroof including a movable panel configured to open and close an opening formed at a roof of the vehicle and a rail provided at each edge portion in the opening in a vehicle width direction and being extended in a front-rear direction of the vehicle, the tilt and slide apparatus including a receiver bracket affixed to the movable panel, the receiver bracket having a first pin at an end of the receiver bracket, a guide block having a first guide channel, a second guide channel and an upper guide channel, the first guide channel extends along a length of the guide block and has an angled portion, the second guide channel positioned at or near an end of the guide block and receives the first pin of the receiver bracket, the upper guide channel extending away from the second guide channel to an opposite end of the guide block and above the first guide channel, a movable drive shoe, a pivot link coupled to the drive shoe, and a lift guide connected to an end of the movable panel, the method including sliding the guide shoe along the rail in a forward direction of the vehicle; sliding the pivot link along the first guide channel of the guide block to control tilting of the movable panel as the drive shoe slides in a forward direction toward the front of the vehicle; maintaining a position of the front of the receiver bracket with the lift guide; and sliding of the tilted movable panel and the guide shoe in a rearward direction opposite the forward direction.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The description set forth below in connection with the appended drawings is intended as a description of various aspects of the disclosed subject matter and is not necessarily intended to represent the only aspect(s). In certain instances, the description includes specific details for the purpose of providing an understanding of the disclosed subject matter. However, it will be apparent to those skilled in the art that aspects may be practiced without these specific details. In some instances, well-known structures and components may be shown in block diagram form in order to avoid obscuring the concepts of the disclosed subject matter.

Reference throughout the specification to "one aspect" or "an aspect" means that a particular feature, structure, characteristic, operation, or function described in connection with an aspect is included in at least one aspect of the disclosed subject matter. Thus, any appearance of the phrases "in one aspect" or "in an aspect" in the specification is not necessarily referring to the same aspect. Further, the particular features, structures, characteristics, operations, or functions may be combined in any suitable manner in one or more aspects. Further, it is intended that aspects of the disclosed subject matter can and do cover modifications and variations of the described aspects.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Furthermore, terms such as "first," "second," "third," etc., merely identify one of a number of portions, components, points of reference, operations and/or functions as described herein, and likewise do not necessarily limit aspects of the disclosed subject matter to any particular configuration or orientation.

Referring now to the drawings, wherein like reference numerals designate identical or corresponding parts throughout several views, the following description relates to a sunroof assembly for an automotive vehicle. As mentioned above, vehicles may be provided with sunroof assemblies having a movable panel that is tilted and slid while the vehicle is traveling at high speeds, e.g., highway speeds. The motor in such sunroof systems has been found to stall such that the sunroom becomes jammed when operated while the vehicle is traveling at high speeds. Disclosed are embodiments that provide a solution to this and other problems. In addition, the disclosed sunroof apparatus is provided as a simplified arrangement having fewer parts than other panoramic sunroof systems.

A panoramic sunroof apparatus of a vehicle roof 10 will be explained. As mentioned above, a panoramic sunroof is a sunroof that extends over a large portion of a vehicle roof to provide sunroof features for both front and rear passengers. A front/rear direction refers to a forward/rearward direction relative to a traveling direction of the vehicle having the roof 10. A right/left direction or a width direction refers to a direction of the vehicle relative to the front of the vehicle. An upward/downward direction refers to a direction relative to ground below the vehicle. An indication that a component or element is above or below relates to the upward/downward direction.

Figure 1:
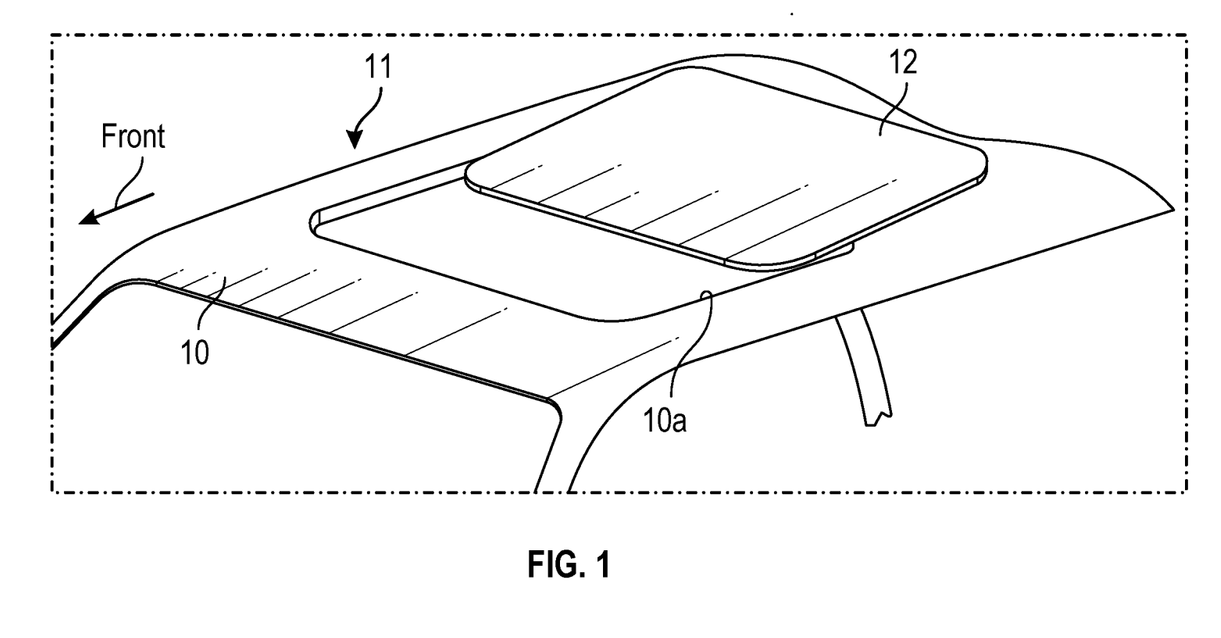
FIG. 1 is a perspective view of a roof in which a sunroof is mounted.

FIG. 1 is a perspective view of a vehicle roof with a sunroof apparatus for a vehicle according to an exemplary aspect of the disclosure. A substantially rectangular opening 10a is formed in a vehicle roof 10 of a vehicle such as an automobile. The opening 10a may have rounded corners. The sunroof apparatus 11 includes a movable panel 12 substantially in a rectangular form. Corners of the movable panel 12 may be rounded to match the shape of the opening 10a. The movable panel 12 may be made of glass, or a safety glass laminate. The movable panel 12 moves in the front/rear direction for opening and closing the opening 10a. Although the drawing shows a single movable panel, the sunroof apparatus may have more than movable panel. A movable panel may be in a forward position toward the front of the vehicle. However, the movable panel may be in a rearward position, or in a middle position of the sunroof apparatus.

Figure 2:
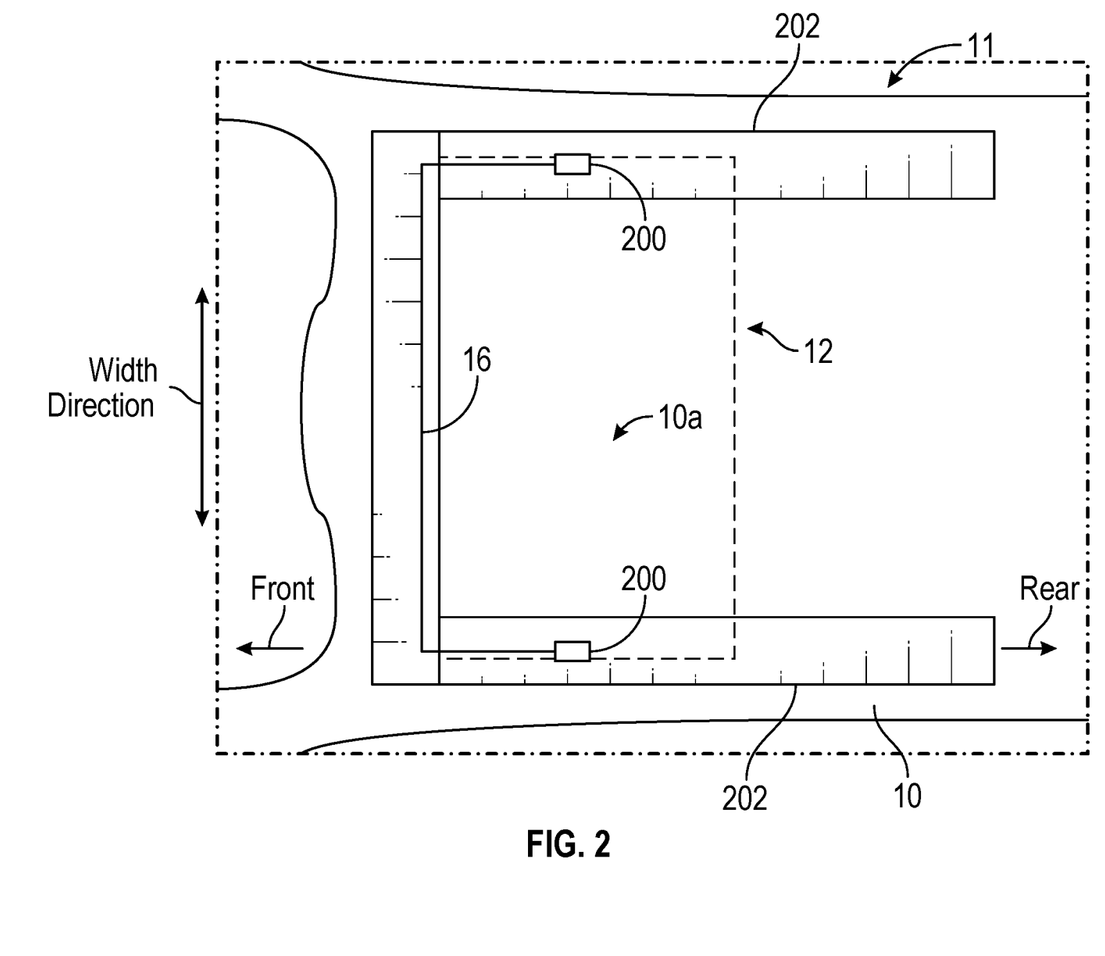
FIG. 2 is a plan view of a sunroof.

Regarding FIG. 2, the sunroof apparatus 11 includes a pair of guide rails 202 provided at opposed edge portions of the opening 10a relative to the vehicle width direction. Each of the guide rails 202 extend in the front/rear direction. The sunroof apparatus operates as a tilt and outer slide apparatus which utilizes various functional components. In particular, the functional components move in the front/read direction along the guide rails 202 to tilt and slide the movable panel 12. The functional components are supported and guided relative to the guide rails 202. The movable panel 12 is mounted between the functional components so as to be connected and supported by the functional components. The guide rails 202 may be made of metallic plate, which to save weight may be made of aluminum alloy.

Respective front edges of the guide rails 202 are connected to each other by a front housing that extends in the vehicle width direction. An electric drive source such as an electric motor serving as a drive source and including an output gear, for example, may be provided at a substantially intermediate portion of the front housing in a longitudinal direction of the housing. The electric drive source is connected to functional components, in particular a drive shoe 200, via a pair of drive belts 16 made of resin material, for example, and substantially formed in a strap form so as to simultaneously move the functional components provided at the respective guide rails 202 in the front/rear direction.

Figure 3:
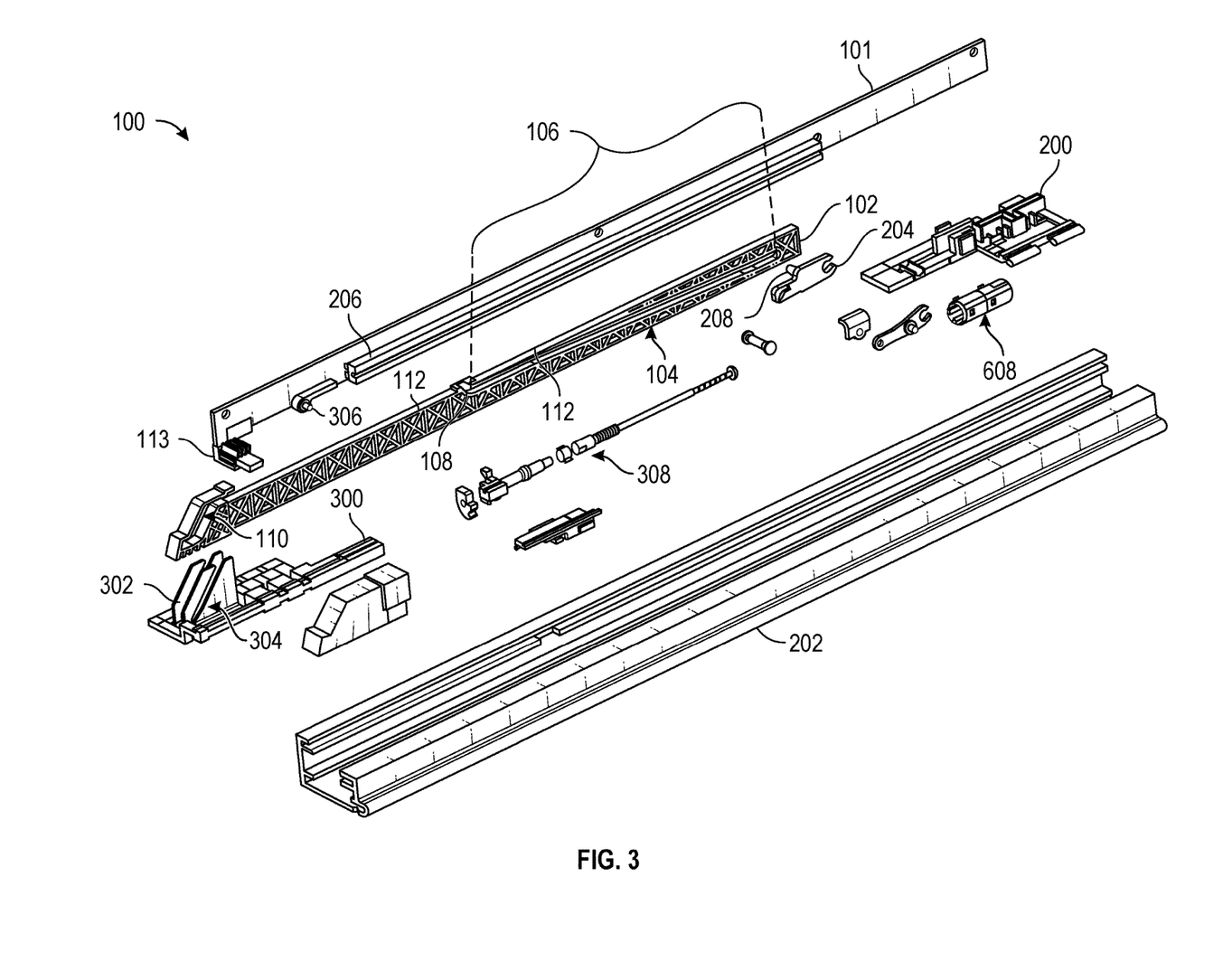
FIG. 3 is a partial view of a tilt and outer slide apparatus in accordance with an exemplary aspect of the disclosure.

FIG. 3 illustrates a tilt and outer slide apparatus 100 for a panoramic sunroof in accordance with an exemplary aspect of the disclosure. FIG. 3 shows functional components of the apparatus 100. A movable receiver bracket 101 is a functional component to which the glass panel is mounted. The glass panel of the sunroof is supported by the moveable receiver bracket 101. Also a functional bracket 206 may be mounted to the receiver bracket 101 along a lower edge of the receiver bracket 101. The functional bracket 206 may be made of metallic plate. The receiver bracket 101 is guided by a first pin 113 mounted to an end of the receiver bracket 101 and a second pin 306 mounted adjacent to an end of the functional bracket 206 at a position between the functional bracket 206 and the first pin 113. The pins 113 and 306 may be made of metal of similar material to the receiver bracket 101. The receiver bracket 101 may be made of metallic plate, of a metal such as aluminum alloy, and be of rectangular shape with a length that is at least as long as the glass panel. The first pin 113 may have a rectangular cross-section. The second pin 306 may have a circular cross-section. Components including the functional bracket 206 and pins 113 and 306 may be mounted to the metal receiver bracket, for example by a weld. The receiver bracket 101 is of minimum height to accommodate the thickness of the glass panel as well as the functional bracket 206.

The apparatus 100 includes a guide block 102. The guide block 102 is a rectangular beam that is of a length that is substantially a majority of the length of the guide rail 202 and includes guide channels formed as grooves in side surfaces of the block 102. The channels are wide enough to receive and guide pins that are part of other functional components. The guide block 102 may be made of a molded plastic.

The guide block 102 defines a first guide channel 104 that extends along a portion of a longitudinal direction of the guide block 102. The first guide channel 104 is at least as long as half of the length of the guide block 102. The first guide channel 104 facilitates tilting of the glass panel as it has an angled portion 106 that is relatively long and a curved portion 108 positioned at an end of the first guide channel and forms a continuous channel with the angled portion 106. The curved portion 108 is relatively short in length compared to the angled portion 106. The angled portion 106 is relatively straight and slopes downward from a position near a top edge at a center region of the guide block 104 to near a lower edge of the guide block 102 at an end toward a rear direction. The lower edge of the guide block 104 that the angled portion 106 comes near is a rigid support structure that prevents bending of the guide block in the vertical or upward/downward direction.

Further, the guide block 102 defines a second guide channel 110 positioned at or near an end of the guide block 104 in the forward direction and extends to a relatively long guide surface (e.g., a relative flat or even upper surface) 112. The second guide channel 110 receives the first pin 113 attached to and protruding perpendicular from an end of the receive bracket 101. The second guide channel 110 facilitates lifting of an end of the receiver bracket 101 as the receiver channel begins to move in a direction of the rear of the vehicle.

The long guide surface 112 extends away from the second guide channel 110 to an opposite end of the guide block 102. The long guide surface 112 is positioned above the first guide channel 104, and in particular above the angled portion 106 of the first guide channel 104. The long guide surface 112 extends substantially along an upper edge of the guide block 102.

The system 100 also includes a drive shoe 200 that is configured to be pulled (e.g., via a tension of a guide cable 16 affixed to the drive shoe 200) along a guide rail 202 and includes a pivot link 204 pivotably coupled thereto such that the pivot link 204 is able to pivot and/or rotate relative to the drive shoe 200. The drive shoe 200 may be made of a metallic plate with some components made of resin materials. The pivot link 204 may be made of a metallic plate. The pivot link 204 is configured to slidably couple to a functional bracket 206, which is affixed to the receiver bracket 101, to control tilting of the glass panel. The pivot link 204 may be a flat plate with a third pin 208 extending from a face of the plate. In some embodiments, the pivot link 204 includes two separate parts, an inner part and an outer part connected to each other. The pivot link having two parts may pivot at a pair of pins protruding from rear sections of the two parts. The two parts may be spaced apart by a distance of the width of the receiver bracket 101 so that as the pivot link 204 rotates about the connecting pin, the two sides stay on either side of the receiver bracket 101 while the receiver bracket 101 is supported by a connector part that connects between the two parts. The pin 208 or pair of pins may be made of a metal that is the same as the material of the pivot link 204, with the pin 208 welded to a side surface of the metallic plate. In particular, the pivot link 204 may include a third pin 208 protruding from a surface of the pivot link 204 that slides along the first channel 104 of the guide block 102, which causes the pivot link 204 to pivot relative to the drive shoe 200.

The apparatus 100 also includes a lift guide 300 that is configured to move along the rail 202. The lift guide 300 includes a bracket 302 defining an angled or slightly curved guide channel 304 into which a second pin 306 of the receiver bracket 101 extends. The lift guide 300 facilitates maintaining a position of the front of the receiver bracket 101 and/or sliding the receiver bracket 100 after the receiver bracket 100 is tilted.

Further, the apparatus 100 includes a check or locking assembly 308. The check or locking assembly 308 is configured to removably couple the drive shoe 200 and the lift guide 300 together during sunroof operation. The check assembly 308 provides coupling and decoupling functionality for the drive shoe 200 and the lift guide 300. The lift guide 300 also includes a support plate on which a check assembly 308 is coupled.

Figure 4:
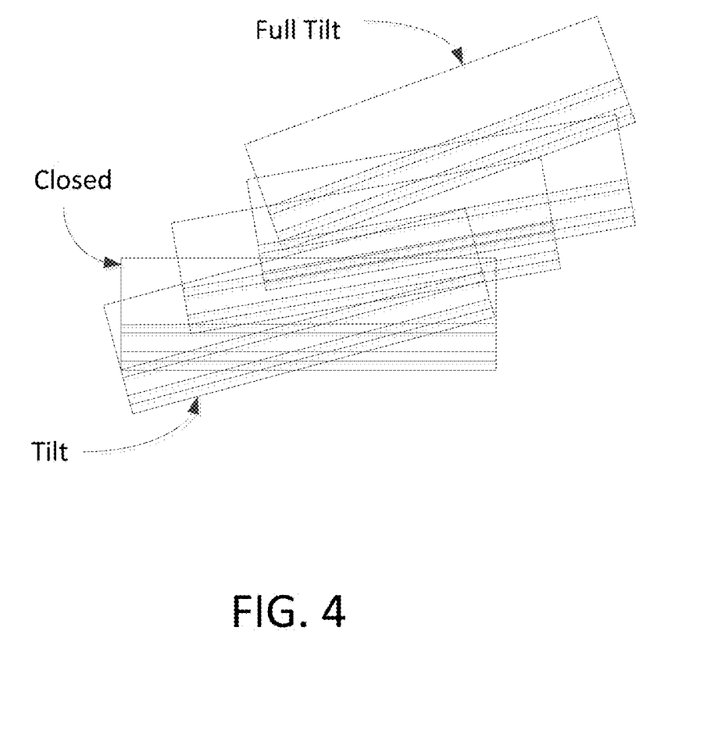
FIG. 4 is a close-up view of tilt positions of the movable panel.
Figure 5:
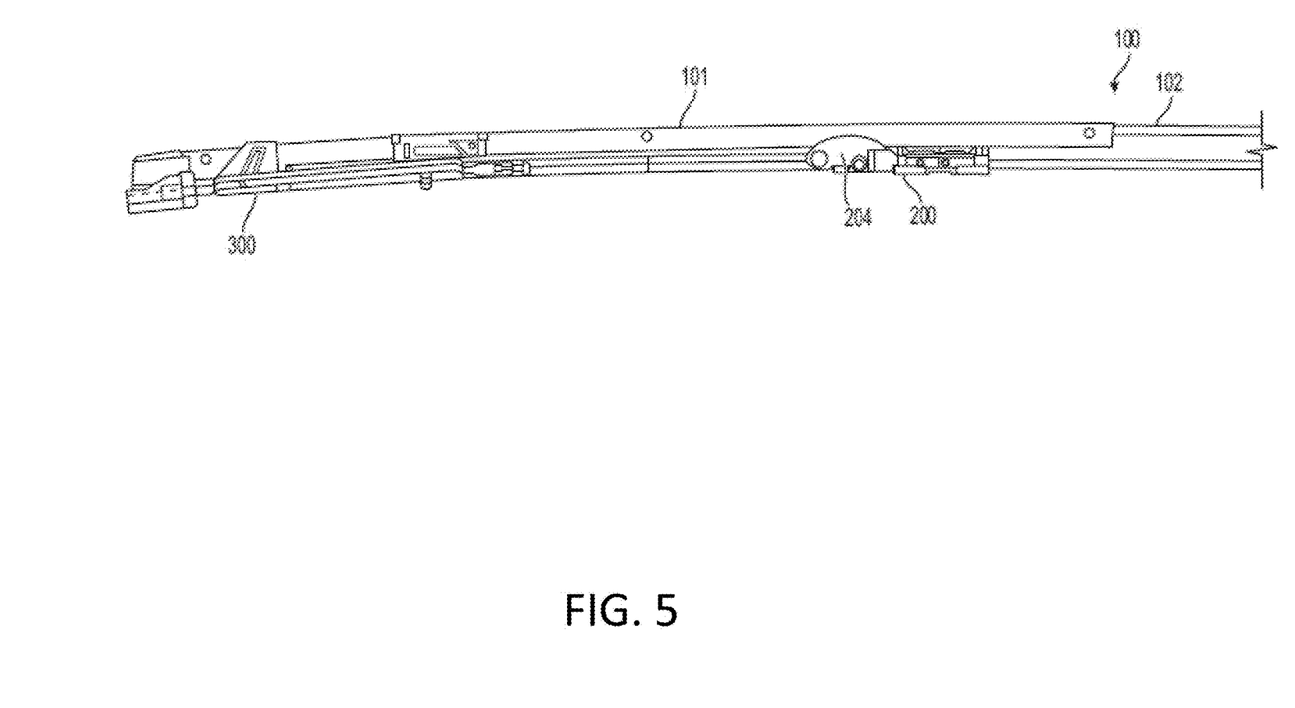
FIG. 5 is a side view of the tilt and outer slide apparatus in a closed position.

Next an operation of the tilt and outer slide apparatus 100 will be discussed. Regarding FIG. 4, the tilt and outer slide apparatus 100 moves the glass panel from a closed position to a tilt position, then to a full tilt position. FIG. 5 is a side view of the tilt and outer slide apparatus in a closed position. The drive shoe 200 rests at its farthest position from the forward end of the rail 202. The pivot link 204 rests in a position that is the same level as the drive shoe 200. The movable receiver bracket 101 holds the glass panel in a position that covers the entire opening 10a. The lift guide 300 is located in a forward position of the rail 202.

Figure 6:
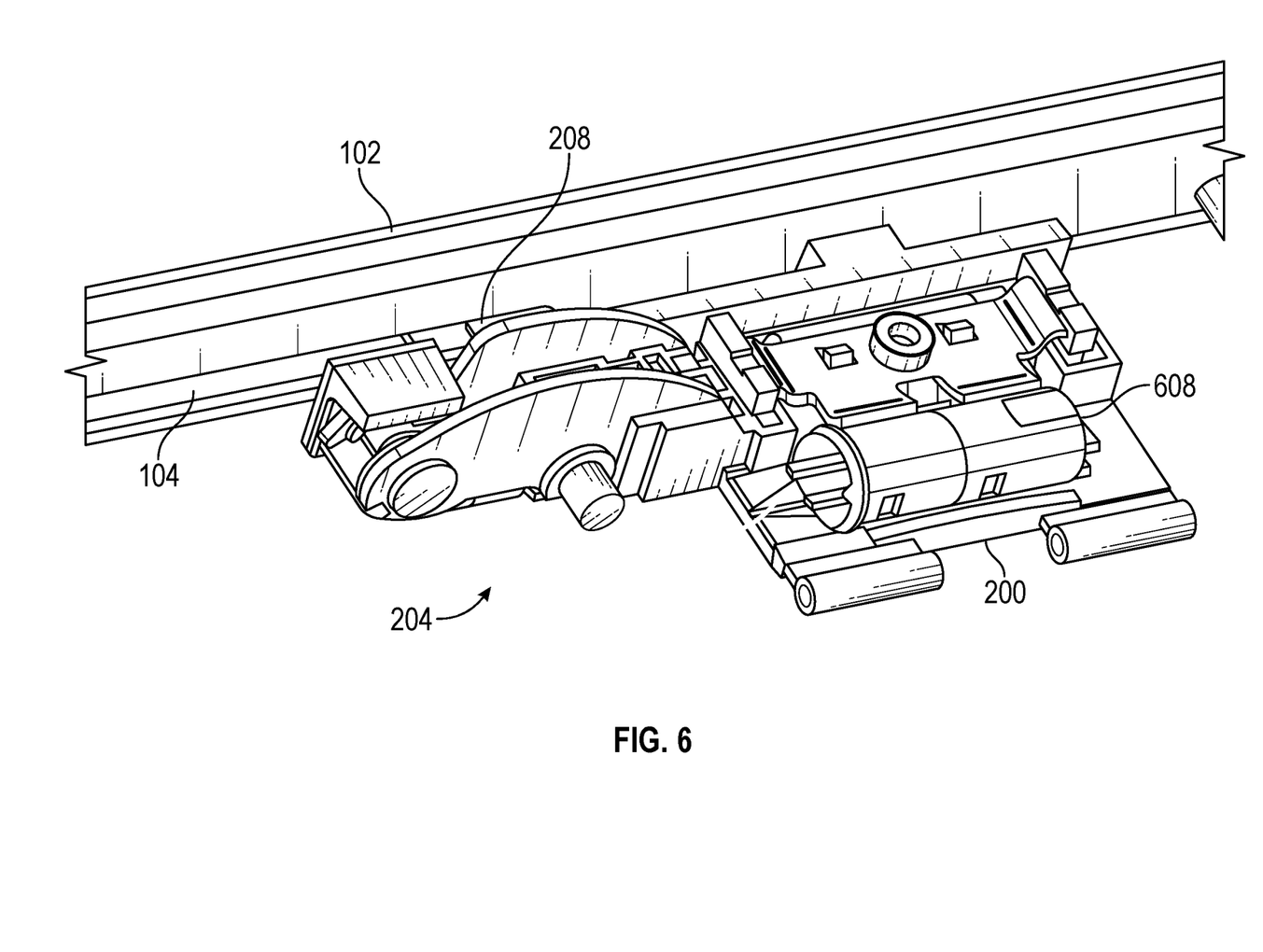
FIG. 6 is a perspective view of the drive shoe.

FIG. 6 is a perspective view of the drive shoe. The drive shoe 200 is configured to move along the guide block 102 toward the lift guide 300. The drive shoe 200 includes a receptacle 608 of the check assembly 308 that is configured to receive a pin of the check assembly 308 in an opening at a forward face of the receptacle 608. The receptacle 608 may be held in place by the drive shoe 200 for positioning of the opening in a vertical position and a horizontal position. The drive shoe 200 includes a rigid body that is set reward of the pivot link 204 to support the pivot link 204 and the receptacle 608 as it is guided by the rail 202.

Figure 7:
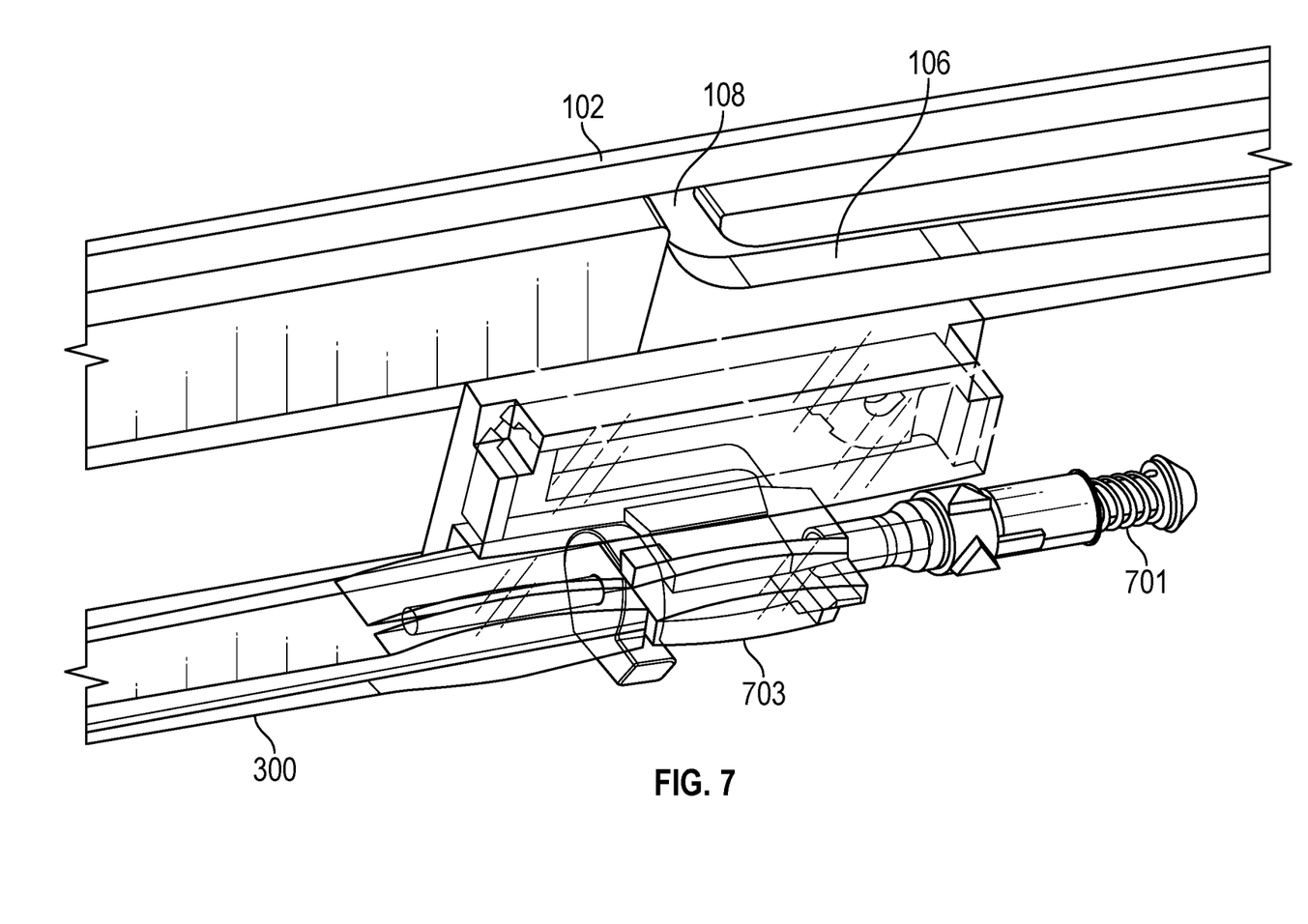
FIG. 7 is a perspective view of a check assembly and lift guide.

FIG. 7 is a perspective view of a check assembly and lift guide. The check assembly 308 includes a mechanical lock 703 and a pin 701 that extends through the mechanical lock, each of which is mounted to the lift guide 300.

Figure 8:
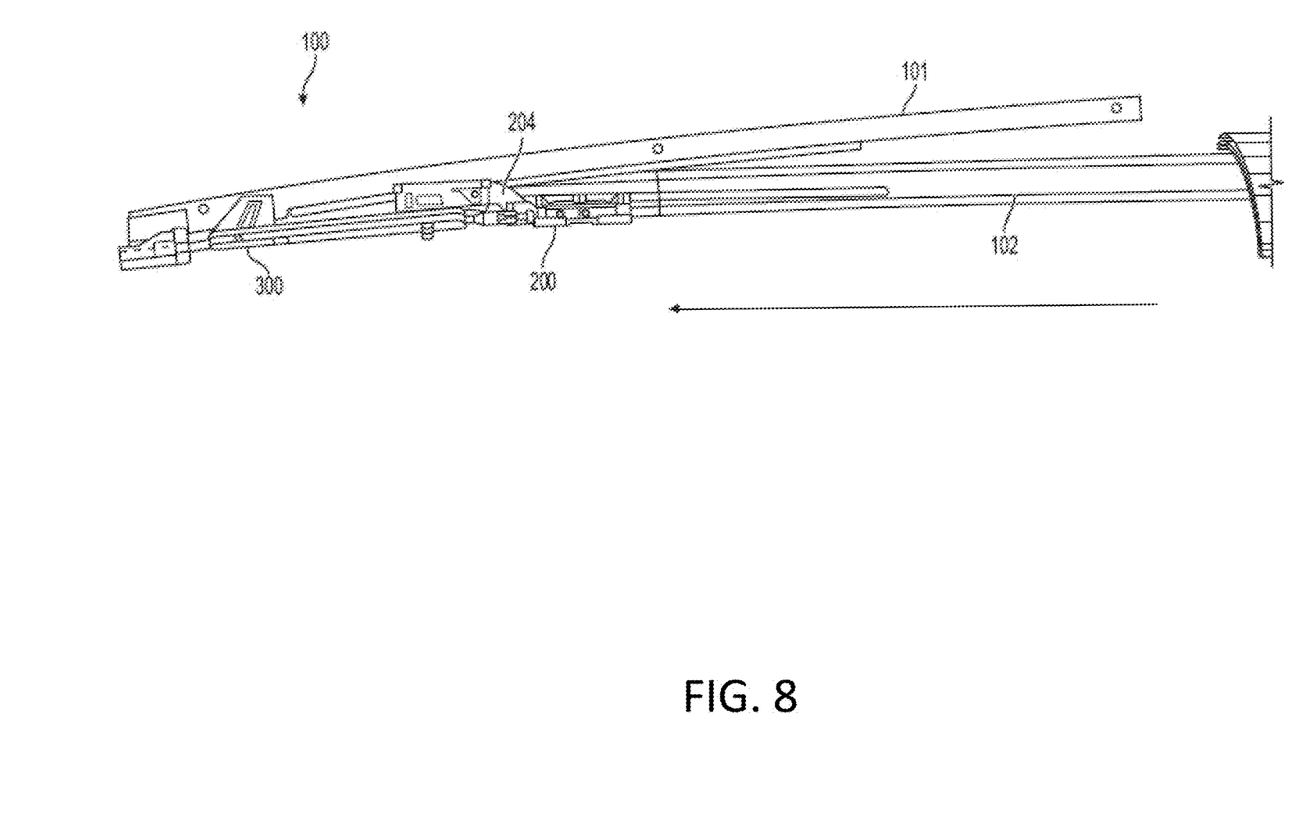
FIG. 8 is a side view of the tilt and outer slide apparatus partially tilt as it moves in a direction toward the front of the vehicle.

FIG. 8 is a side view of the tilt and outer slide apparatus partially tilt as it moves in a direction toward the front of the vehicle. To tilt the receiver bracket 101 (and subsequently, the glass panel), the drive shoe 200 moves along the rail 202 in a forward direction toward the lift guide 300 (i.e., toward a front of a vehicle).

As the drive shoe 200 moves, the third pin 208 of the pivot link 204 slides along the angled portion 106 of the first guide channel 104 and out of an end of the curved portion 108 and, as a result, the pivot link 204 pivots relative to the drive shoe 200 to slowly tilt or pivot the receiver bracket 101 relative to the first pin 113. That is, the pivot link 204 gradually lifts a central portion of the receiver bracket 101 via the bracket 206.

Figure 9:
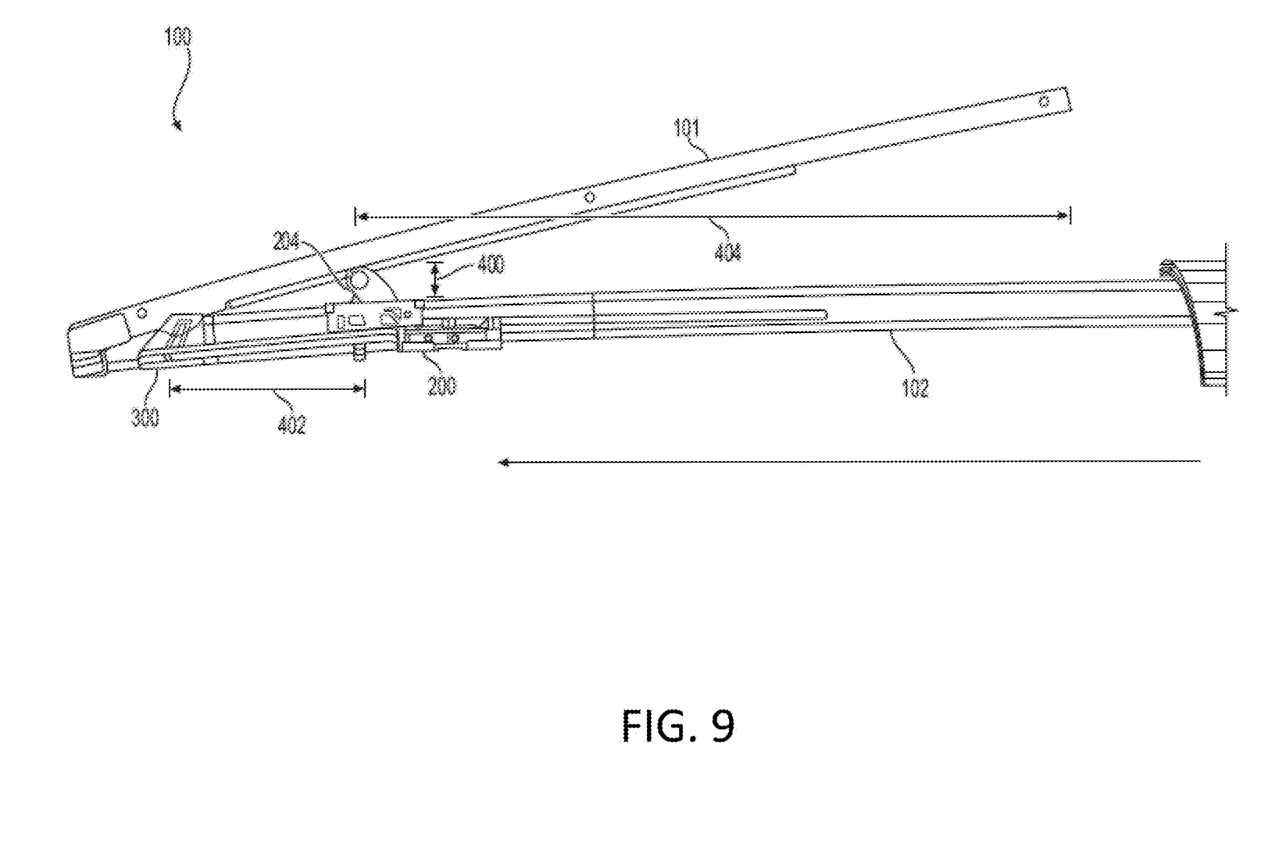
FIG. 9 is a side view of the tilt and outer slide apparatus with a drive shoe coupled to a lift guide in a fully tilted position.
Figure 10:
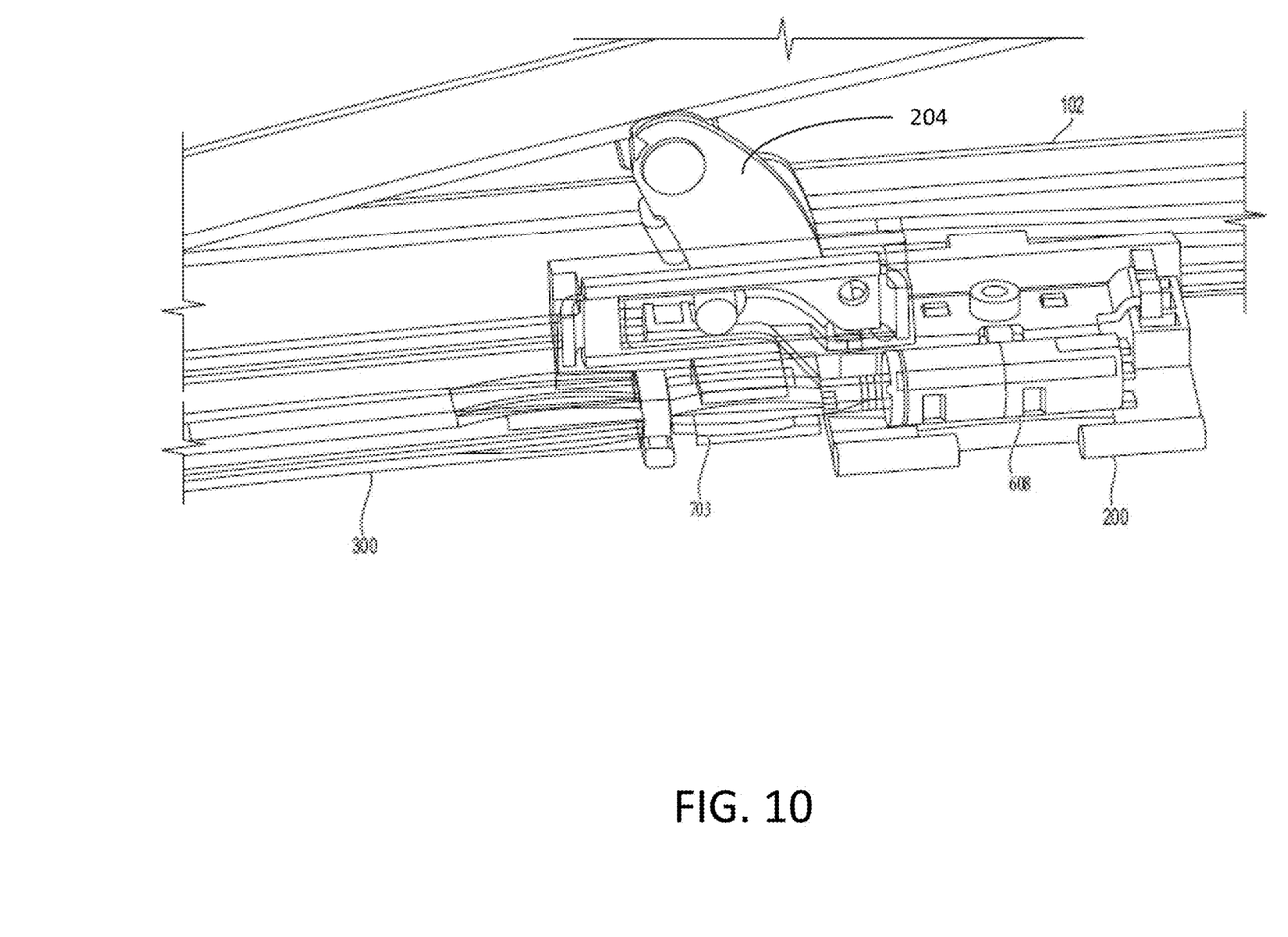
FIG. 10 is a perspective view of a drive shoe and lift gate coupled together via the check assembly.

FIG. 9 is a side view of the tilt and outer slide apparatus with a drive shoe coupled to a lift guide in a fully tilted position. When the drive shoe 200 reaches the lift guide 300, the drive shoe 200 couples to the lift guide 300 via the check or lock assembly 308, two portions 608, 701 of which are coupled to the respective drive shoe 200 and the lift guide 300. A perspective view of a drive shoe and lift gate coupled together via the check assembly is shown in FIG. 10.

Figure 11:
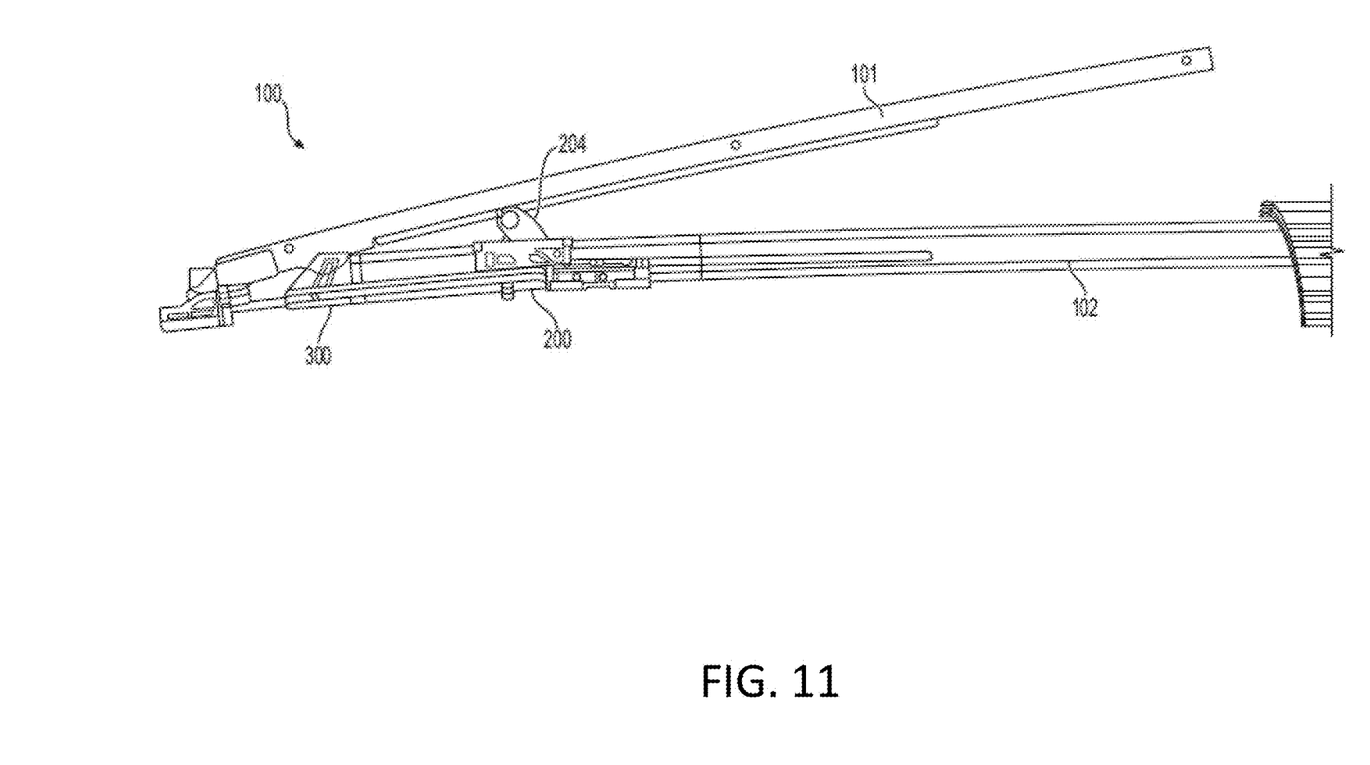
FIG. 11 is a side view of the tilt and outer slide apparatus as the drive shoe and lift guide begin to pull the receiver bracket backward.

FIG. 11 is a side view of the tilt and outer slide apparatus as the drive shoe and lift guide begin to pull the receiver bracket rearward. Regarding FIG. 11, both the drive shoe 200 and the lift guide 300 are pulled cooperatively along the guide block 102 in a rearward direction (i.e., toward a back of the vehicle) to further lift and slide the receiver bracket 101 in the lifted position of the pivot link 204. The pivot link 204 remains in the pivoted position to maintain the receiver bracket 101 in the lifted position.

In particular, when the drive shoe 200 and the lift guide 300 begin to move in the rearward direction, the first pin 113 of the receiver bracket 101 moves along the second guide channel 110 to reach the long guide surface 112 of the guide block 102. The movement of the first pin 113 along the second guide channel 110 lifts the end of the receiver bracket 101. Then, as the drive shoe 200 and lift guide 300 continue moving in the rearward direction, the first and third pins 113, 208 slide along the long guide surface 112 and above the first guide channel 104 which provides support for the receiver bracket 101 (i.e., neither of the pins 113, 208 fall into the curved portion 108). An inner surface defined by the guide channel 304 of the lift guide bracket 302 imparts a force on the second pin 306, thereby causing the receiver bracket 101 to slide. The gradual lifting of the receiver bracket 101 as the pivot link 204 slides along the angled portion 106 in the forward direction then lifting the end of the receiver bracket 101 when the first pin 113 travels along the second guide channel enables a slow tilt rate of the receiver bracket 101.

Figure 12:
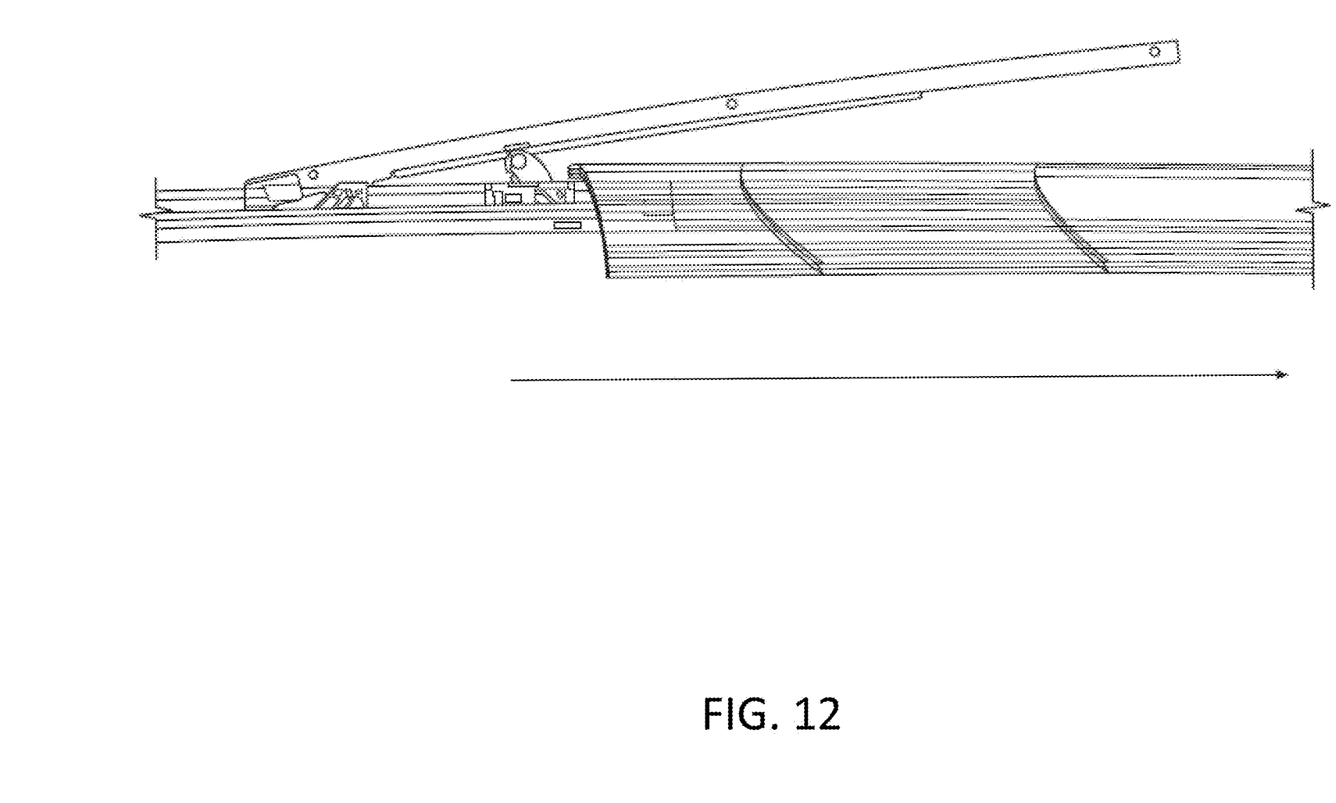
FIG. 12 is a side view of the tilt and outer slide apparatus with the receiver bracket in the open position.

FIG. 12 is a side view of the tilt and outer slide apparatus with the receiver bracket in the open position. The tilt and outer slide apparatus moves with the receiver bracket 101 and glass panel 12 in a tilted position such that the guide block 102 slides below the vehicle roof 10.

As a result, the system 100 provides a relatively long tilt-up stroke (i.e., a slow tilting rate) and slide stroke of the receiver 101 via the guide block 102, the drive shoe 200, and the lift guide 300, which improves sunroof performance during high vehicle speeds as well as improves customer satisfaction.

Additionally, aspects of the system 100 are adjustable to accommodate different customer requirements. Parameters, such as a length, an angle, a degree of curvature, of the angled portion 106 and/or the curved portion 108 of the first guide channel 104 can be changed to provide a different (e.g., longer or shorter) tilt-up stroke. Referring again to FIG. 9, a change in length 400 of the pivot link 204, which would change the height of the pivot link in an upward pivoted position, can be made to provide a different tilt angle for the receiver bracket 101. Further still, as shown in FIG. 9, a particular distance 402 between the drive shoe 200 and the lift guide 300 can be changed to provide a different tilt-up stroke and/or a different amount of overhang 404 of the receiver bracket 101.

A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components.

The foregoing discussion describes merely exemplary embodiments of the present disclosure. As will be understood by those skilled in the art, the present disclosure may be embodied in other specific forms without departing from the spirit or essential characteristics thereof. Accordingly, the disclosure is intended to be illustrative, but not limiting of the scope of the disclosure, as well as the claims. The disclosure, including any readily discernible variants of the teachings herein, defines in part, the scope of the foregoing claim terminology such that no inventive subject matter is dedicated to the public.

What is claimed is:

1. A tilt and slide apparatus for a sunroof of a vehicle, comprising:
    a movable panel configured to open and close an opening formed at a roof of the vehicle;
    a rail provided at each edge portion in the opening in a vehicle width direction and being extended in a front-rear direction of the vehicle;
    a receiver bracket affixed to the movable panel, the receiver bracket having a first pin at an end of the receiver bracket;
    a guide block having a first guide channel, a second guide channel and an upper guide channel, the first guide channel extends along a length of the guide block and has an angled portion, the second guide channel positioned at or near an end of the guide block and receives the first pin of the receiver bracket, the upper guide channel extending away from the second guide channel to an opposite end of the guide block and above the first guide channel;
    a drive shoe configured to slide along the rail and a pivot link pivotally coupled to the drive shoe, the pivot link configured to slide along the first guide channel of the guide block to control tilting of the movable panel as the drive shoe slides in a forward direction toward the front of the vehicle; and
    a lift guide connected to an end of the movable panel for maintaining a position of the front of the receiver bracket and for facilitating sliding of the movable panel in a rear direction opposite the forward direction.

2. The tilt and slide apparatus of claim 1, wherein the first guide channel includes a curved portion that is substantially shorter in length than the angled portion, and
    wherein the pivot link is configured to slide along the angled portion and out through the curved portion which causes the pivot link to pivot relative to the drive shoe and tilt the receiver bracket about the first pin.

3. The tilt and slide apparatus of claim 1, wherein the drive shoe is moved in the forward/rearward direction by drive belts which are driven by an electric motor.

4. The tilt and slide apparatus of claim 1, wherein the angled portion slopes downward from a center upper edge of the guide block to a lower edge at an end of the guide block toward a rearward direction.

5. The title and slide apparatus of claim 1, further comprising a check assembly which couples the drive shoe and the lift guide when the drive shoe is slid in the forward direction to the lift guide, wherein the check assembly maintains the coupling of the drive shoe and the lift guide when the drive shoe and the lift guide are moved to slide the receiver bracket rearward.

6. The tilt and slide apparatus of claim 5, wherein the second guide channel is formed such that when the drive shoe and the lift guide begin to move in the rearward direction, the first pin moves along the second guide channel and lifts the end of the receiver bracket having the first pin.

7. The tilt and slide apparatus of claim 1, wherein the second guide channel and the upper guide channel are formed such that as the receiver bracket moves in the rearward direction, the first pin moves from the second guide channel to along the upper guide channel which provides support for the receiver bracket.

8. The tilt and slide apparatus of claim 7, wherein the pivot link includes a third pin which is configured such that as the receiver bracket moves in a rearward direction, the third pin of the pivot link moves along the upper guide channel such that the first pin and the third pin provide support for the receiver bracket.

9. The tilt and slide apparatus of claim 1, wherein a maximum angle of tilting of the movable panel is proportional to the length of the pivot link.

10. The tilt and slide apparatus of claim 1, wherein length of a tilt-up stroke to tilt the movable panel is proportional to the distance between the drive shoe and the lift guide.

11. A method for a tilt and slide apparatus for a sunroof of a vehicle, the sunroof including a movable panel configured to open and close an opening formed at a roof of the vehicle and a rail provided at each edge portion in the opening in a vehicle width direction and being extended in a front-rear direction of the vehicle, the tilt and slide apparatus including a receiver bracket affixed to the movable panel, the receiver bracket having a first pin at an end of the receiver bracket, a guide block having a first guide channel, a second guide channel and an upper guide channel, the first guide channel extends along a length of the guide block and has an angled portion, the second guide channel positioned at or near an end of the guide block and receives the first pin of the receiver bracket, the upper guide channel extending away from the second guide channel to an opposite end of the guide block and above the first guide channel, a drive shoe, a pivot link coupled to the drive shoe, and a lift guide connected to an end of the movable panel, the method comprising:

sliding the guide shoe along the rail in a forward direction of the vehicle;

sliding the pivot link along the first guide channel of the guide block to control tilting of the movable panel as the drive shoe slides in a forward direction toward the front of the vehicle;

maintaining a position of the front of the receiver bracket with the lift guide; and sliding of the tilted movable panel and the guide shoe in a rearward direction opposite the forward direction.

12. The method of claim 11, wherein the first guide channel includes a curved portion that is substantially shorter in length than the angled portion, and wherein the sliding of the pivot link comprises sliding the pivot link along the angled portion and out through the curved portion to cause the pivot link to pivot relative to the drive shoe and tilt the receiver bracket about the first pin.

13. The method of claim 11, wherein the sliding of the drive shoe in the forward/rearward direction is performed by drive belts which are driven by an electric motor.

14. The method of claim 11, wherein the tilt and slide apparatus further comprises a check assembly, the method further comprising coupling the drive shoe and the lift guide when the drive shoe is slid in the forward direction to the lift guide, and maintaining the coupling of the drive shoe and the lift guide while sliding the receiver bracket rearward.

15. The method of claim 14, wherein when the drive shoe and the lift guide begin to move in the rearward direction, moving the first pin along the second guide channel to lift the end of the receiver bracket having the first pin.

16. The tilt and slide apparatus of claim 11, wherein as the receiver bracket moves in the rearward direction, moving the first pin from the second guide channel to along the upper guide channel in order to provide support for the receiver bracket.

17. The tilt and slide apparatus of claim 16, wherein as the receiver bracket moves in a rearward direction, moving a third pin of the pivot link along the upper guide channel such that the first pin and the third pin provide support for the receiver bracket.

* * * * *